United States Patent
Reali et al.

(10) Patent No.: US 11,702,713 B2
(45) Date of Patent: Jul. 18, 2023

(54) PROCESS AND PLANT FOR PREHEATING A METAL CHARGE FED IN CONTINUOUS TO AN ELECTRIC MELTING FURNACE

(71) Applicant: Tenova S.p.A., Milan (IT)

(72) Inventors: Silvio Maria Reali, Milan (IT); Cesare Giavani, Milan (IT)

(*) Notice: Subject to any disclaimer, the term of this patent is extended or adjusted under 35 U.S.C. 154(b) by 247 days.

(21) Appl. No.: 17/256,202

(22) PCT Filed: Jul. 9, 2019

(86) PCT No.: PCT/IB2019/055830
§ 371 (c)(1),
(2) Date: Dec. 26, 2020

(87) PCT Pub. No.: WO2020/016702
PCT Pub. Date: Jan. 23, 2020

(65) Prior Publication Data
US 2021/0262048 A1    Aug. 26, 2021

(30) Foreign Application Priority Data

Jul. 18, 2018 (IT) .................. 102018000007276

(51) Int. Cl.
*C21C 5/56* (2006.01)
*F27B 3/18* (2006.01)
(Continued)

(52) U.S. Cl.
CPC ............... *C21C 5/565* (2013.01); *F27B 3/18* (2013.01); *F27D 13/002* (2013.01); *F27D 17/002* (2013.01); *C21C 2100/06* (2013.01)

(58) Field of Classification Search
CPC ....... C21C 5/565; C21C 2100/06; F27B 3/18; F27D 13/002; F27D 17/002
(Continued)

(56) References Cited

U.S. PATENT DOCUMENTS 5,400,358 A     3/1995  Vallomy
6,155,333 A *  12/2000  Vallomy ................. C21C 5/527
                                                            164/476
(Continued)

FOREIGN PATENT DOCUMENTS

EP     0744585  * 11/1996 ............. C21C 5/565

*Primary Examiner* — Scott R Kastler
*Assistant Examiner* — Michael Aboagye
(74) *Attorney, Agent, or Firm* — Themis Law

(57) ABSTRACT

A process and a plant for preheating a metal charge fed in continuous to an electric melting furnace through a preheating tunnel provided with a horizontal conveyor, wherein the metal charge is hit, in countercurrent, by the exhaust fumes or gas leaving the electric melting furnace and by jets of gas ejected through a plurality of nozzles positioned on the hood of the tunnel. The nozzles are arranged in groups interspaced from each other in a longitudinal direction with respect to the tunnel, and generate a small-scale turbulence or inject small fast gas jets that can penetrate the main gas stream passing through the preheating tunnel, and simultaneously generate a "horseshoe vortex" structure composed of a descending central gas flow ("downwash"), and ascending flows ("upwash") close to the side walls of the preheating tunnel, which enable a desired circulation of the gases.

15 Claims, 9 Drawing Sheets

(51) Int. Cl.
*F27D 13/00* (2006.01)
*F27D 17/00* (2006.01)

(58) Field of Classification Search
USPC ........ 266/44, 144, 177, 901, 251; 373/9, 79, 373/80; 75/10.6, 10.61, 10.62, 10.66, 75/10.63, 10.38, 10.41
See application file for complete search history.

(56) References Cited

U.S. PATENT DOCUMENTS

| | | | |
|---|---|---|---|
| 7,648,551 B2 * | 1/2010 | Sellan | F27D 17/003 75/382 |
| 9,551,531 B2 * | 1/2017 | Miani | F27D 13/00 |
| 9,677,814 B2 * | 6/2017 | Giavani | F27D 17/004 |
| 2020/0224972 A1 * | 7/2020 | Huang | C21C 5/565 |

* cited by examiner

Straight flow path if NO air injection

PRIOR ART

PROCESS AND PLANT FOR PREHEATING A METAL CHARGE FED IN CONTINUOUS TO AN ELECTRIC MELTING FURNACE

FIELD OF THE INVENTION

The present invention relates to an improved process for preheating a metal charge material fed in continuous to an electric furnace for the production of molten metal.

The invention also relates to a plant for implementing this process.

BACKGROUND OF THE INVENTION

A process and plant for pre-heating a metal charge (generally scrap) is well known to skilled persons in the field, wherein said charge is fed in continuous to an electric melting furnace by means of a horizontal conveyor; said preheating process facilitates the subsequent melting process.

The pre-heating of the charge takes place during the passage inside a tunnel in which the sensible heat and combustion heat of the exhaust gases of the melting process are exploited (in some particular cases pre-heating could also be favored by suitable auxiliary burners). The exhaust fumes are then evacuated from the preheating tunnel and sent to a suitable treatment system. The combustion heat that is exploited in the preheating process is essentially provided by the completion of the combustion of the CO (carbon monoxide) and $H_2$ (hydrogen) released by the process underway in the melting furnace, whereas the necessary oxygen is generally provided with the supply of environmental air.

A process and a plant such as those briefly described above are disclosed for example by U.S. Pat. No. 5,400,358, which describes the injection of the air needed for combustion uniformly along the preheating tunnel. This solution teaches the injection of air distributed along the preheating tunnel in such a quantity as to guarantee an excess of oxygen in the order of 3-5% so as to ensure the complete combustion of the unburnt gases, assuming that the seal between furnace and tunnel is almost perfect. In plant-engineering practice, it has been seen that this situation cannot be achieved and there are always significant infiltrations of external air (in particular at the interface between the furnace and tunnel), often to an extent already more than sufficient for ensuring the complete combustion of the process gases exiting from the furnace; it has also been observed that these air infiltrations are not able to reach sufficient turbulence conditions, as this air tends to follow the internal walls of the heating tunnel, and mixing and combustion with the process gases take place slowly. An excessive infiltration of ambient air into the preheating tunnel must be absolutely avoided as it would overly lower the temperature of the gases, and if this temperature reaches a value very close to or even lower than the CO ignition limit, there is the risk of not completing its combustion with the consequent release of this toxic gas into the environment, in addition to the significant loss of efficiency of the pre-heating system of the charge.

Within the context of the technical solution described above, the injectable air from the hood is consequently extremely low if not zero; this fact worsens the problem related to the low turbulence, and prevents the best exploitation of the energy available inside the preheating tunnel.

SUMMARY OF THE INVENTION

The general objective of the present invention is to overcome the drawbacks of the known art and, in view of this objective, according to the invention, to improve the exploitation of the energy present in the fumes for heating the charge.

More specifically, the objective of the present invention is to increase the heat exchange between the hot process fumes and the metal charge.

The above objectives are achieved by a process and plant produced according to the enclosed independent claims and subordinate claims.

Thanks to the present invention, the heat exchange between the hot process fumes and the metal charge is improved by increasing the turbulence and the mixing of the gaseous stream inside the preheating tunnel, with a consequent acceleration of the combustion processes and an increase in the convective heat exchange coefficients between said combustion gas and charge material. This effect is obtained with high-speed jets of gas; the gas used is generally air, but the use of a different gas is not excluded, if needed to manage the chemical composition inside the preheating tunnel; this gas can also be advantageously preheated.

In particular, an object of the present invention relates to a process and plant for preheating a metal charge fed in continuous to an electric melting furnace through a preheating tunnel provided with a horizontal conveyor, wherein said metal charge is hit, in countercurrent, by the exhaust fumes or gases leaving said electric melting furnace and by jets of gas ejected through a plurality of nozzles positioned in the hood of said tunnel provided with side walls and said hood. Said nozzles are arranged in groups interspaced with respect to each other in a longitudinal direction with respect to the tunnel, and generate a small-scale turbulence or inject small fast gas jets that can penetrate the stream, and said nozzles simultaneously generate a "horseshoe vortex" structure, consisting of a descending central gas flow ("downwash"), and ascending flows ("upwash") close to the side walls of the preheating tunnel which allow the necessary circulation of the gases.

According to the present invention, said nozzles are arranged in groups, in each of which the nozzles are aligned in correspondence with certain transversal sections of the hood of the tunnel, suitably spaced apart. This allows a small-scale turbulence and simultaneously a large-scale vortex structure to be generated: the first one corresponds to the fact that the small fast jets of gas are able to penetrate the main gas stream passing through the tunnel, considerably accelerating the mixing and combustion of the gases; the large-scale vortex structure, which increases the heat exchange between fumes and charge, is commonly defined a "horseshoe vortex" and is characterized by a descending central flow ("downwash"), which increases the heat exchange in the center of the preheating tunnel, and ascending flows ("upwash") close to the side walls of the tunnel which allow the necessary circulation of the gases, and which, after transferring part of their heat energy to the metal charge in the descending phase, limit the heat exchange with the side walls of the tunnel and horizontal conveyor. Contrary to what is disclosed in the known art, the above-mentioned gas jets are not arranged uniformly along the preheating tunnel but are rather arranged in groups, at least two, suitably interspaced; this is to avoid interference of a fluid-dynamic nature and to allow, first of all, a good mixing of the gases and a rapid development of the combustion (with a small-scale turbulence effect) and subsequently pushing them towards the metal charge (with the "horseshoe vortex" effect).

Contrary to what is present in the known art, the nozzles are not dimensioned so as to supply all the combustion air in a distributed and uniform mode, but, instead, they are dimensioned as small fast jets whose primary function is to supply kinetic energy and modify the field of motion according to what is described above; for this reason, the above-mentioned jets can be more accurately defined as "fluid-dynamic turbulence generators" or more simply, "fluid-dynamic turbulators".

The use of "fluid-dynamic turbulators" is much easier and cheaper than the alternative solution of increasing the turbulence inside the preheating tunnel by the insertion of deflector panels, or so-called "static turbulators"; these deflectors must operate within a gas flow characterized by high temperature and high content of dust and they are therefore normally built as water-cooled metal panels, which is not an efficient solution from a thermal point of view; independently from how these deflector panels are built, their use has been practically abandoned due to their rapid wear and frequent breakages.

The known art does not take into consideration the fact that in practice, there is always a significant infiltration of ambient air into the charge preheating tunnel through unavoidable openings, and that the quantity of combustion air is variable during the process, whereas the need for a good mixing is a substantially constant.

The advantage deriving from the present invention is therefore evident, whereby the operation of jets for controlling the turbulence inside the preheating tunnel is substantially decoupled by the control of the supply of possible combustion air.

BRIEF DESCRIPTION OF THE DRAWINGS

The structural and functional characteristics of the invention and its advantages with respect to the known art will appear more evident from the following description, referring to the attached drawings, which illustrate a possible non-limiting embodiment of the invention itself applied to an electric arc furnace (EAF) for melting metal scrap charged in continuous.

In the drawings.

DETAILED DESCRIPTION OF EMBODIMENTS OF THE INVENTION

Figure 1:
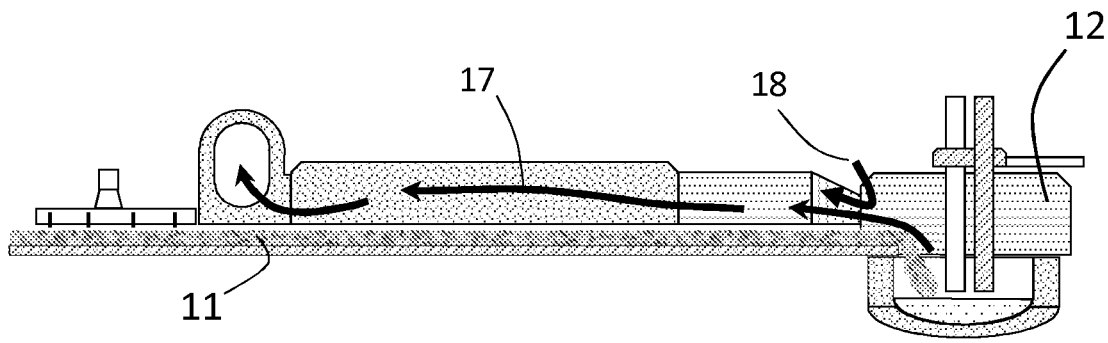
FIG. 1 illustrates a plant according to the known art.
Figure 2:
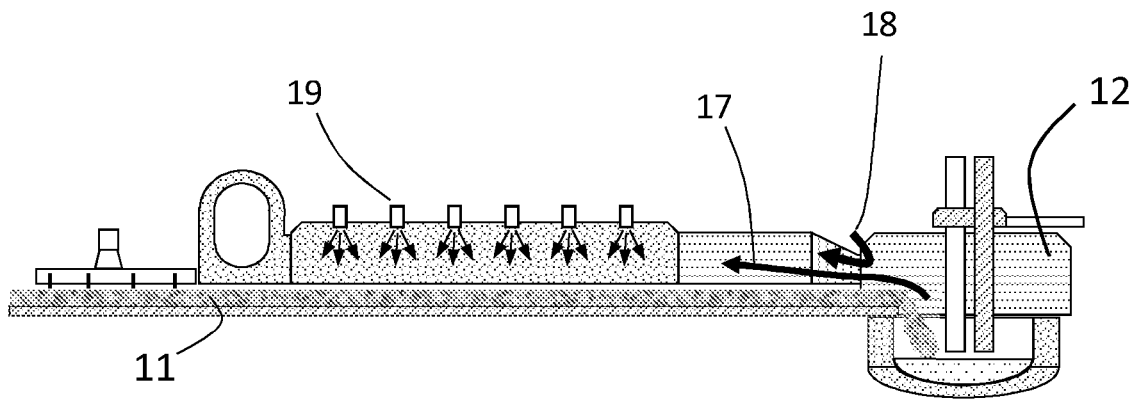
FIG. 2 illustrates a plant according to the known art provided with combustion air injectors uniformly distributed along the preheating tunnel.
Figure 3:
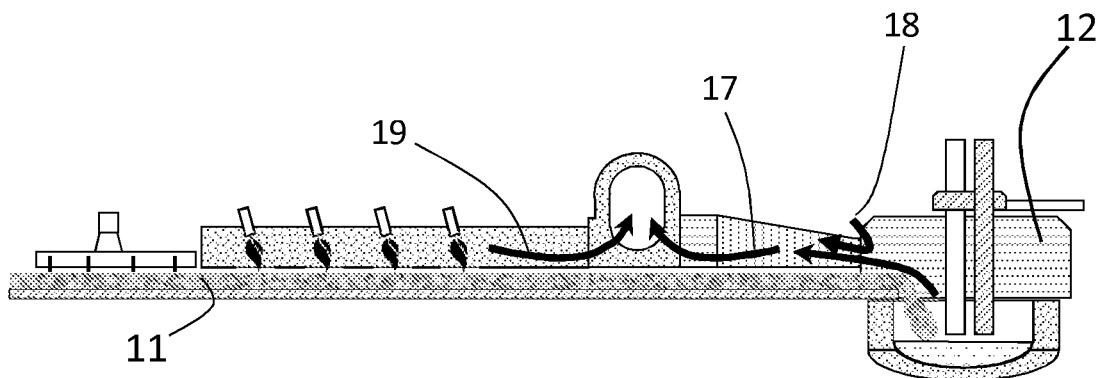
FIG. 3 illustrates a plant according to the known art provided with a preheating section with burners and a heating section by means of off-gas connected by a suction/evacuation section of the fumes.

With reference to the figures, FIGS. 1-3 illustrate three plants produced according to the known art, in particular, FIG. 1 illustrates a traditional plant with a preheating tunnel without gas injectors; FIG. 2 illustrates a plant with air injectors arranged in the preheating tunnel according to the known art; FIG. 3 illustrates a plant with a heating and a preheating section, with burners, connected by a suction/evacuation section of the fumes.

In the figures, 1 indicates as a whole a plant for continuously feeding a metal charge of scrap 11 to an Electric Arc Furnace (EAF) 12 in which a bath of molten metal is present in the liquid state.

In these configurations, the flow 17 of fumes coming from the furnace 12 follows a substantially linear path, which tends to be aligned with the walls of the preheating tunnel, thus moving away from the metal charge 11. Also in the configuration of FIG. 2, with the injectors of combustion air 19, the flow 17 does not undergo significant deviations, as the combustion air introduced by the injectors 10 is normally extremely limited, due to the infiltrations of cold air 18 which are present at the interface between the furnace 12 and the tunnel and which are almost always sufficient for completing the combustion of the fumes 17 coming from the furnace 12.

A plant 1 of this type is described for example in U.S. Pat. No. 5,183,143.

The plant 1 comprises at least one horizontal conveyor 13 suitable for continuously moving the metal charge of scrap 11 towards the electric melting furnace EAF 12, defining the respective continuous horizontal feeding line of the charge 11 to a charging area IV of the furnace itself 12.

As can be clearly seen from the drawings, the horizontal conveyor 13 forms the base of a preheating tunnel 16 of the metal charge of scrap 11.

More specifically, the plant 1 is composed of a preheating section III which brings the metal charge of scrap 11 into the electric melting furnace EAF 12, of an evacuation section of the fumes II present in the plant 1, located, considering the movement direction of the scrap 11, upstream of said preheating section III, and of a section I which receives the metal charge of scrap 11 with a conventional receiving system of the scrap 11.

The horizontal conveyor 13 conveys the metal charge of scrap 11 by oscillation and transfers it from the preheating section III to a movable terminal section, called "connecting car", which leads the scrap 11 into the electric melting furnace EAF 12.

According to the present invention, nozzles are present on the hood of the tunnel of the preheating section III (preheating tunnel 16), for the injection of gas 15.

In particular, these are nozzles for the high-speed injection of gas 15.

Said nozzles 15 are distributed so as to obtain a whirling turbulent motion inside the preheating tunnel 16 to improve the heat exchange between the off-gases 17 and metal charge of scrap 11.

Figures 9A, 9B:
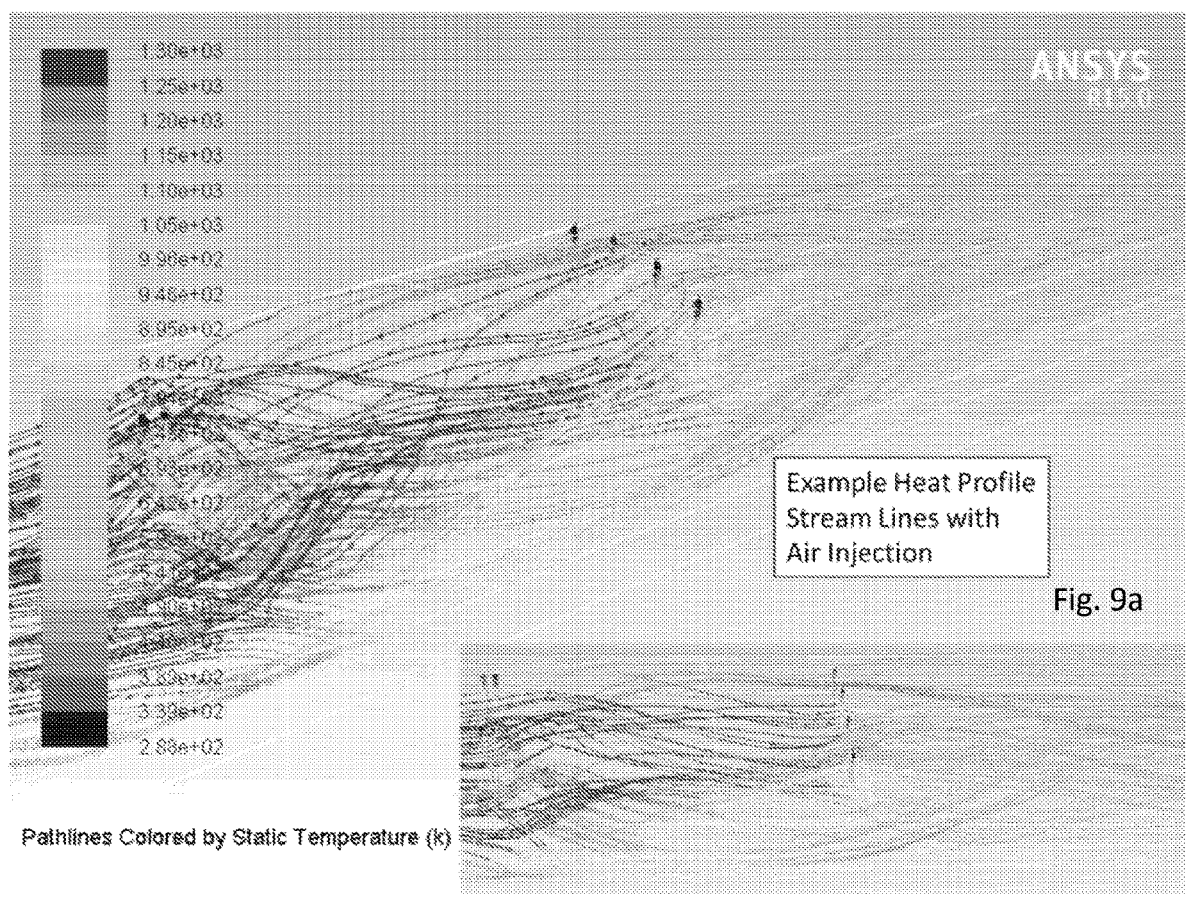
FIGS. 9a and 9b show the different flow of gases in a plant produced according to the present invention with the use of "fluid-dynamic turbulators" formed with high-speed jets.
Figure 10:
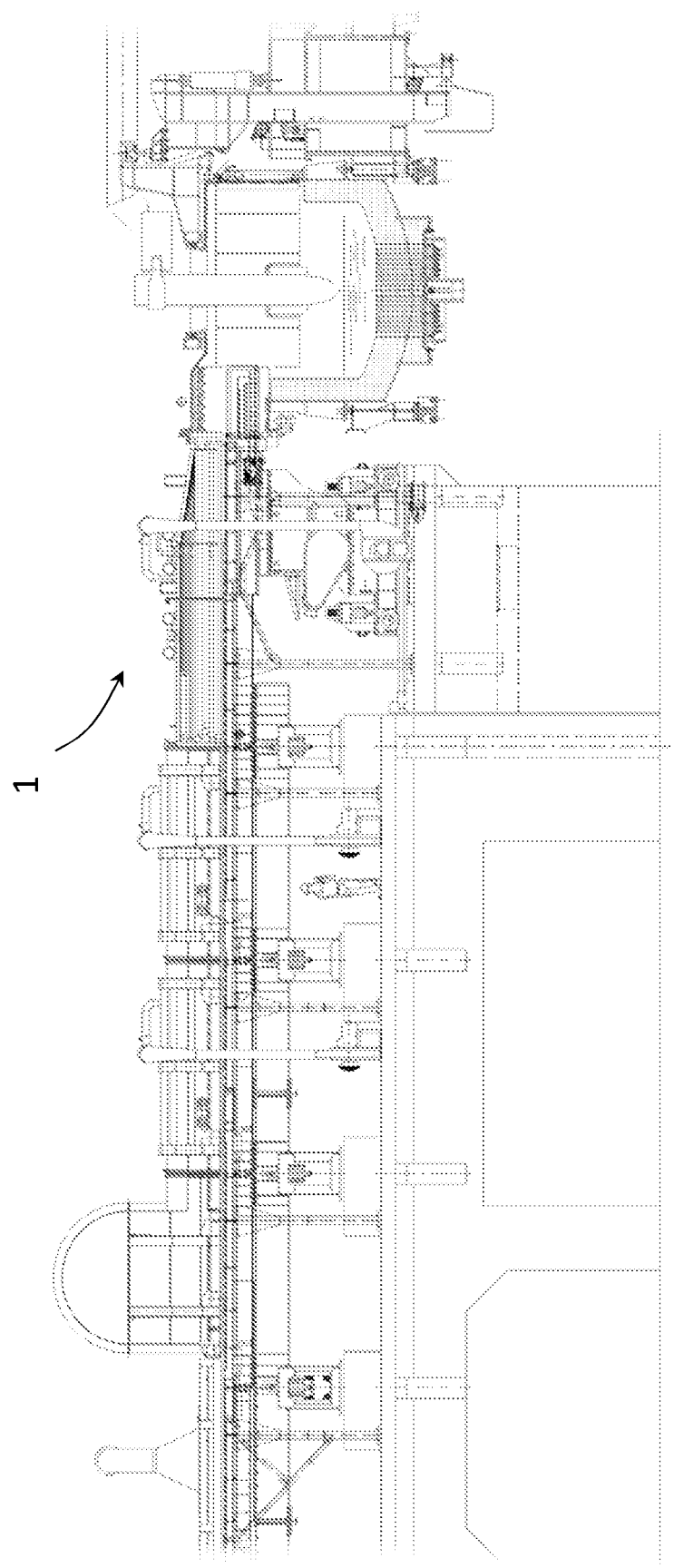
FIG. 10 illustrates a side view of the preheating tunnel with the nozzles provided in each section according to the present invention.

As illustrated in FIGS. 9a and 9b, the nozzles 15 provided on the hood of the tunnel 16 of the preheating section III increase the turbulence of the off-gases 17 thus allowing the following to be obtained:

a greater mixing velocity of the reacting gases and their combustion;

better conditions for completing the combustion of CO, $H_2$ and other gases and possible carbonaceous particulate coming from the electric melting furnace EAF 12;

an improved and more uniform temperature distribution inside the preheating tunnel 16, a better heat exchange between the combustion gases and metal charge 11 on the horizontal conveyor 13 inside the preheating tunnel 16.

Figures 4A, 4B, 4C:
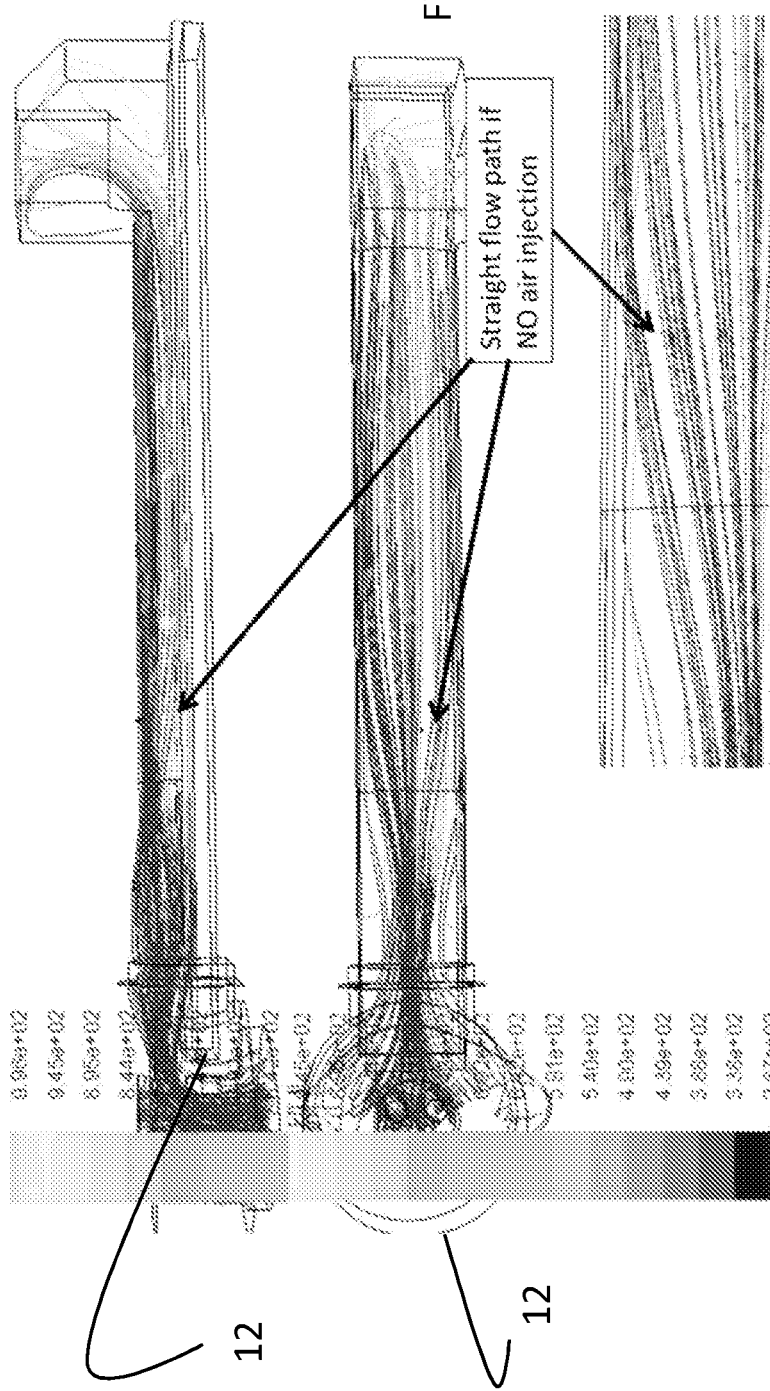
FIGS. 4a, 4b and 4c show, with a side view (4a) and views from above (4b and 4c), the flow of gases in the preheating tunnel of a plant produced according to the known art without high-speed air jets, in particular the view from above in FIG. 4c shows the absence of turbulence in correspondence with air injectors produced and arranged according to the known art.

In the plants of the known art devoid of said nozzles or "fluid-dynamic turbulators" 15, the air entering the plant through the connection portions is uncontrolled, and with a limited turbulence and vorticity, without adequately mixing with the gases (FIGS. 4a, 4b and 4c), and therefore causing a slow and often incomplete combustion inside the preheating tunnel 16.

Thanks to the presence of the "fluid-dynamic turbulators" 15 inside the preheating tunnel 16, on the contrary, a greater mixing of the gases is obtained together with a higher flame intensity, which also help to limit the cooling due to the entry of air from outside of the plant, in particular into the preheating tunnel 16.

Figure 7:
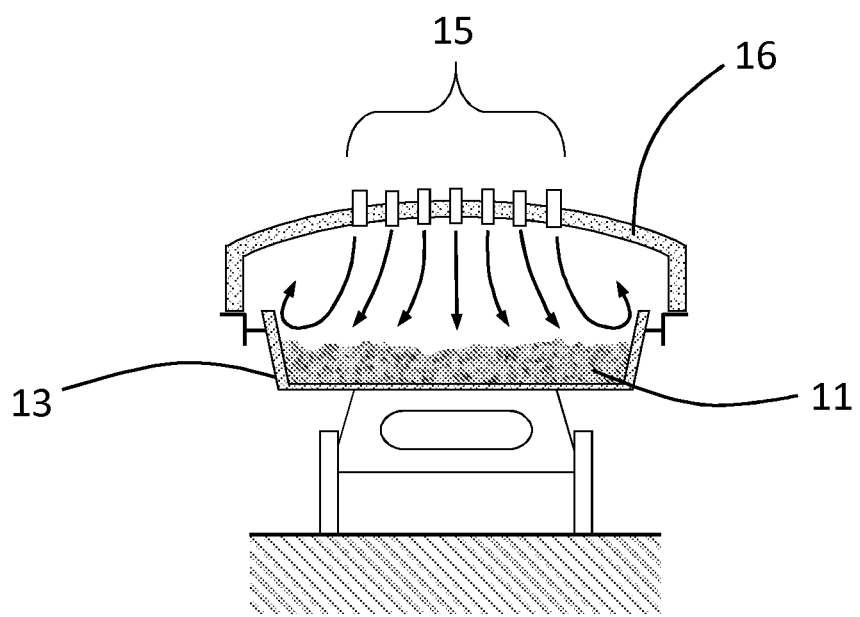
FIG. 7 illustrates the arrangement of the nozzles in a preheating tunnel of a plant according to the present invention.

As illustrated in FIGS. 7 and 9a, 9b, the arrangement of the nozzles or "fluid-dynamic turbulators" 15 allows the so-called downwash portion of the field of motion to be concentrated on the central portion of the horizontal conveyor 13, where the maximum heat exchange is therefore obtained between the metal charge 11 and the gases/fumes 17 present in the preheating tunnel 16.

In order to obtain the above-mentioned whirling-motion configuration, the nozzles 15, and therefore the jets, are distributed transversely on the hood of the preheating tunnel 16 in a non-uniform manner with a greater concentration on the top of the hood of the tunnel 16.

The arrangement of the gas jets is therefore such as to obtain a well-defined whirling structure (FIGS. 9a, 9b) inside the preheating tunnel 16, characterized by:

a descending-flow area in the central area, immediately downstream of the section in which the nozzles 15 are present, in order to increase the heat exchange with the metal charge of scrap 11 in this area, ascending areas on the sides, to limit the heat exchange with the walls of the preheating tunnel 16 and horizontal conveyor 13.

This whirling structure of gases in the preheating tunnel 16 is commonly called a "horseshoe vortex" and is obtained, according to an embodiment of the present invention, by arranging the nozzles 15, and therefore the jets, over about ⅔ of the cross section of the preheating tunnel 16, leaving the two side walls, close to the side walls of the hood of said tunnel 16, free.

Figure 8:
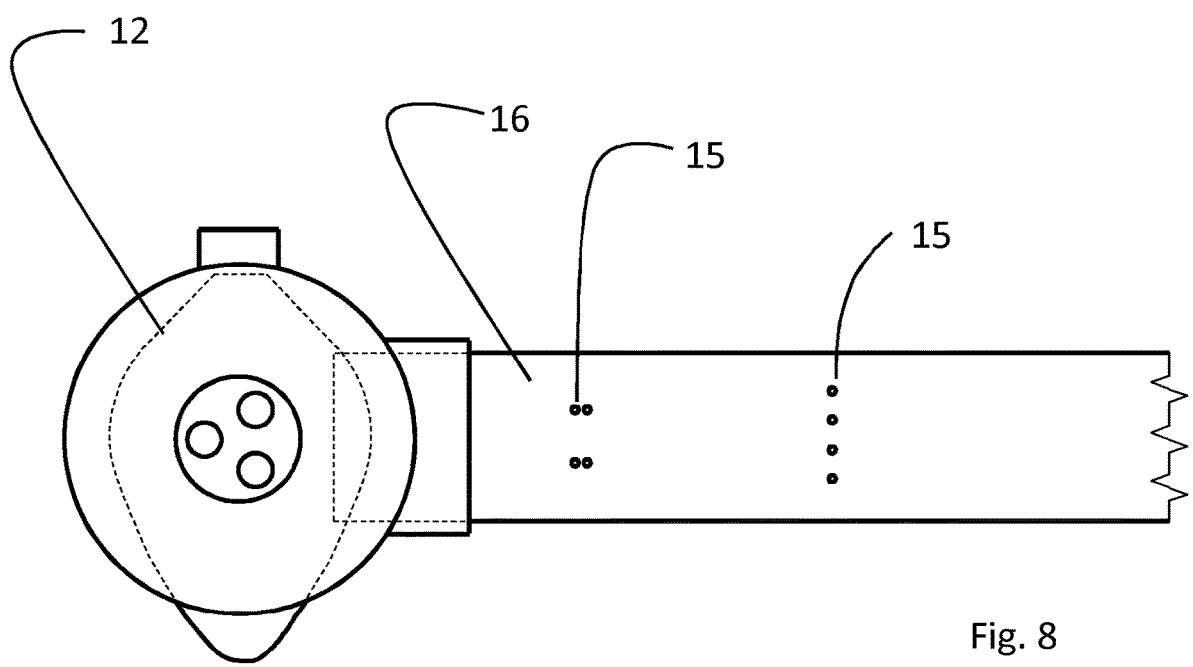
FIG. 8 illustrates the arrangement of the nozzles in a preheating tunnel of a plant according to the present invention.

The arrangement of the nozzles on the hood of the preheating tunnel 16 can vary in relation to the specific plant issues (see for example the embodiment solution shown in FIG. 8), maintaining anyway the requirement that the high-speed jets always intercept the central portion of the flow of off-gases 17, leaving the side portions free and thus favoring the establishment of an upward circulation of the gases and the formation of a horseshoe whirling motion in the entrainment flow.

The high-speed jets that act as "fluid-dynamic turbulators" are not uniformly distributed longitudinally on the hood of the preheating tunnel 16, but according to "injection sections" adequately spaced apart from each other, so as to avoid fluid-dynamic interference phenomena; the distance between two adjacent injection sections should be 4-6 meters depending on the velocity of the gases passing through the preheating tunnel. The space between two adjacent injection sections is needed to allow the high-intensity flame produced by the section upstream to have time to develop before being pushed towards the charge by the injection section immediately downstream.

In order to best exploit the length of the preheating tunnel 16 for improving the heat recovery and completing the combustion of the CO and $H_2$ and possible pollutants in the process gases, the first injection section is positioned as close as possible to the electric melting furnace EAF 12.

The first group of fast gas jets is located in proximity of the electric melting furnace 12, within a distance of 7-10 meters from the same.

The invention provides for gas jets with velocities and/or flow-rates that increase among subsequent "gas injection sections". The number of injection sections varies from two to four, depending on the quantity of combustible gas produced by the melting process under consideration.

Figure 11:
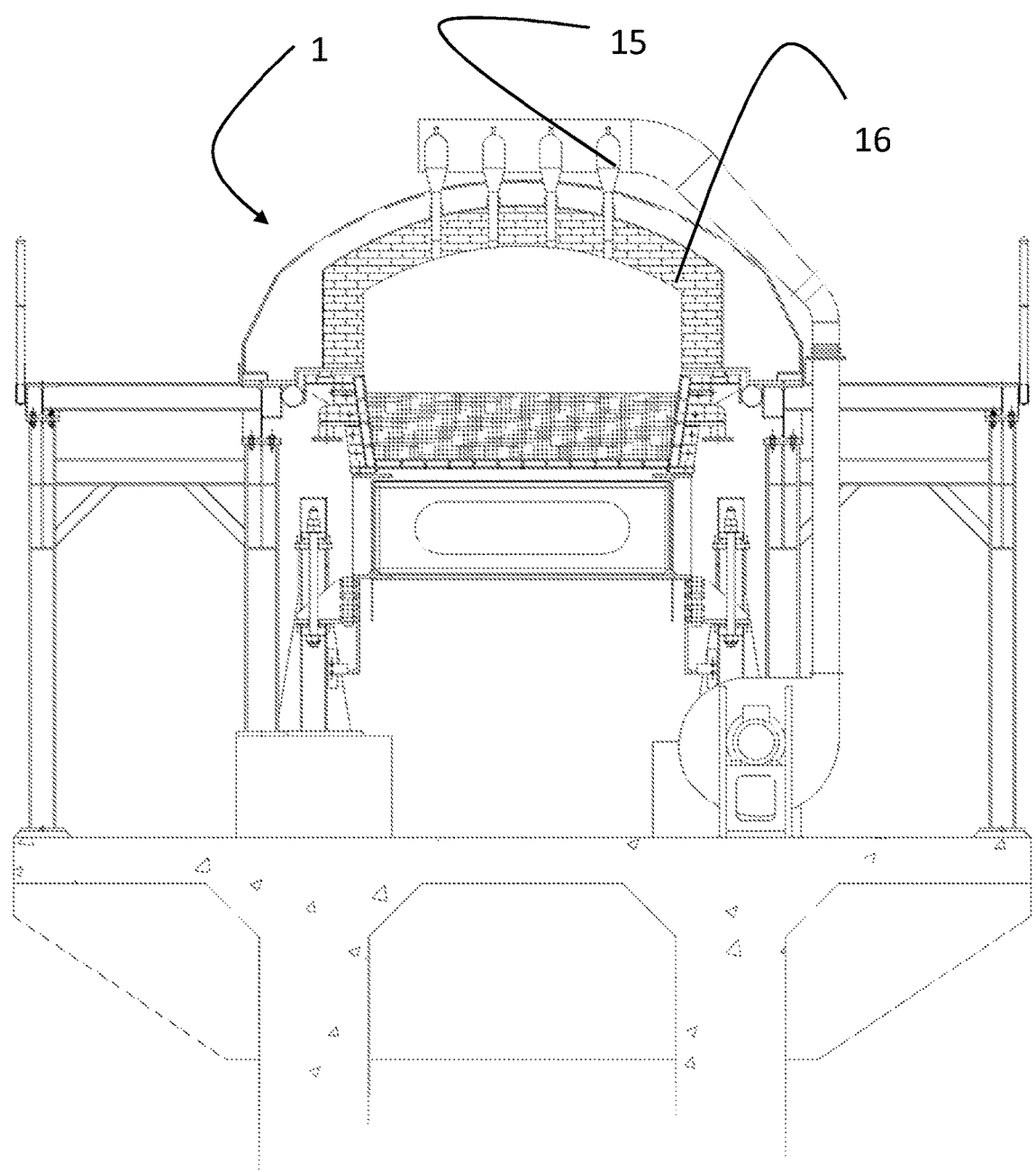
FIG. 11 illustrates, in a cross-section, a portion of the preheating tunnel with the nozzles provided according to the present invention.
Figure 12:
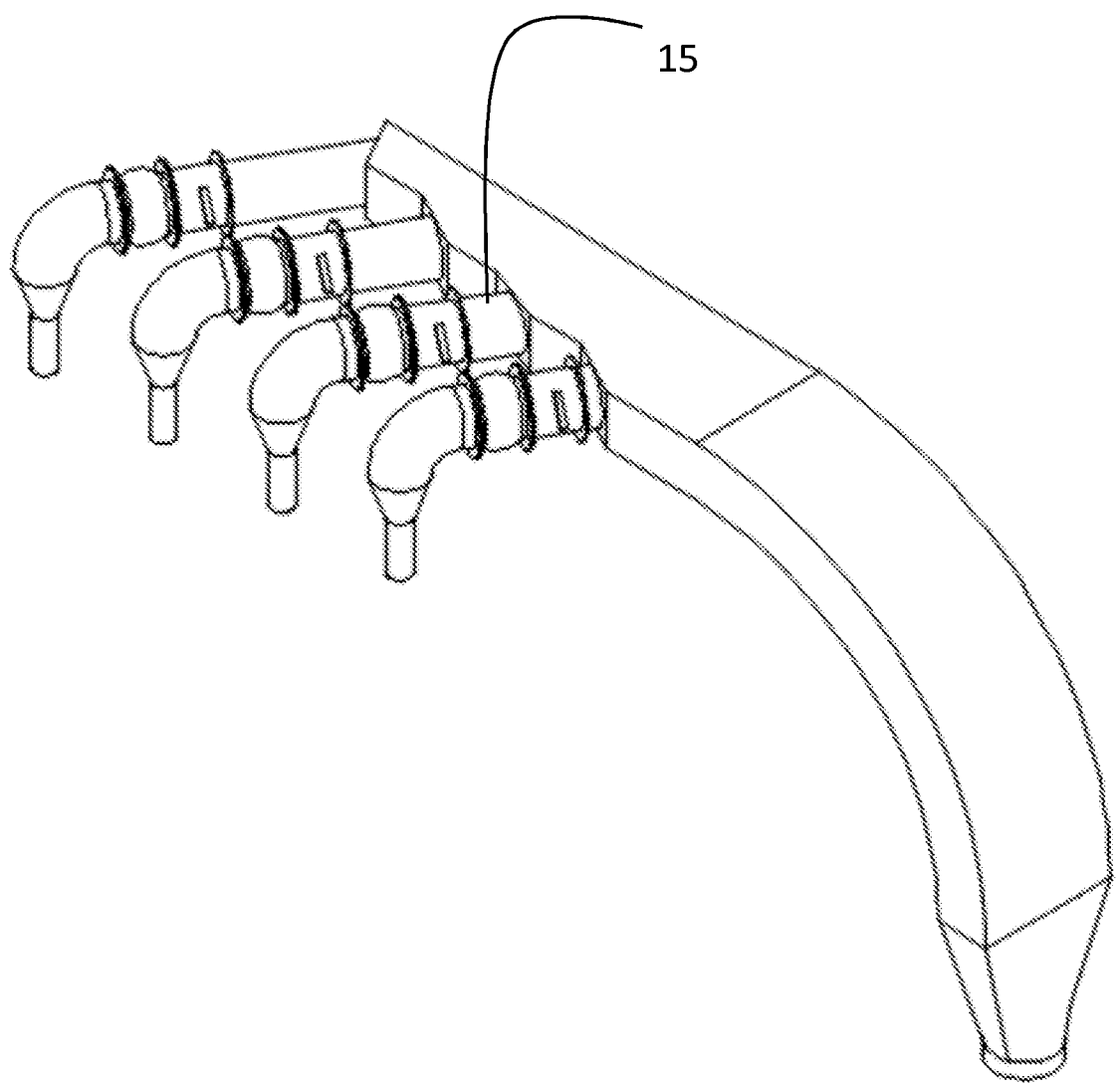
FIG. 12 illustrates a group of nozzles, according to the present invention, that can be positioned in a section of the preheating tunnel.

As illustrated in FIG. 11, starting from the electric melting furnace EAF 12 and following the flow of gases towards the fume suction plant (gas flow opposite to the movement direction of the metal charge 11), the plurality of nozzles 15 forming the first injection section can be located above the connecting car (first water-cooled hood) whereas the nozzles 15 forming the other injection sections can be arranged at the beginning of each segment of the refractory section of the preheating tunnel 16 (refractory lined hood).

In the example, three injection sections are used, each composed of four nozzles 15.

The gas injected is generally air but another gas can also be adopted and the gas used can also be preheated.

Control means of the operating conditions of the nozzles 15 can be provided in each section.

Figure 5:
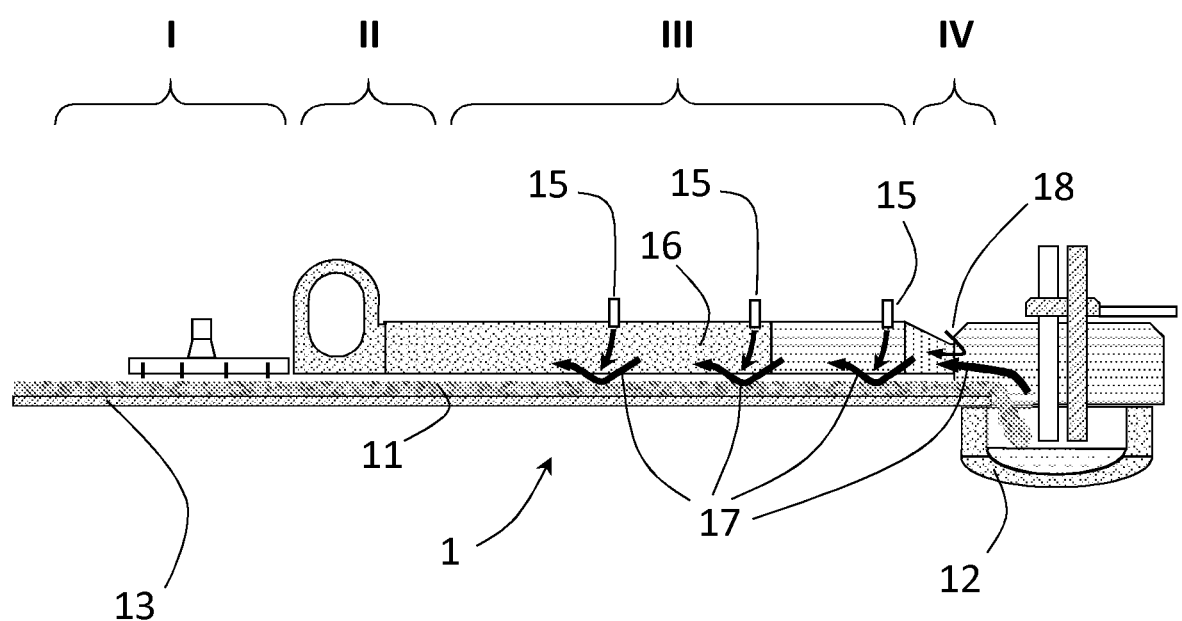
FIG. 5 illustrates a plant according to the present invention.
Figure 6:
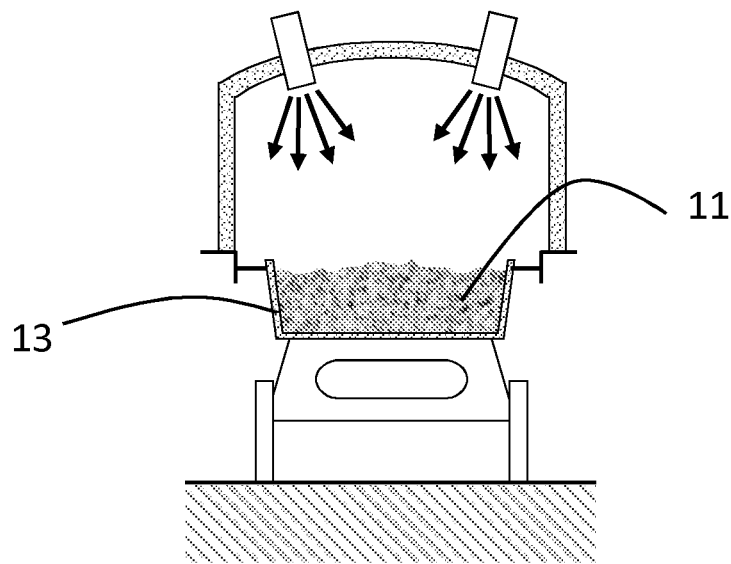
FIG. 6 illustrates the arrangement of the air injectors in a preheating tunnel of a plant according to the known art.

The jets released from the nozzles 15 are small and fast as they must be capable of providing both a mixing and deviation action on the stream of gas passing through the preheating tunnel 16, enabling the "downwash" motion of the hot gases 17 towards the metal charge 11, with a velocity sufficient for penetrating the interstices of the material (the so-called "impingement" effect, as visible in FIG. 5, where the flow of hot gases 17 is pushed downwards towards the metal charge 11), thus improving the convective heat exchange.

This effect is obtained by assessing the flow-rate conditions and velocity of the gas flows involved in the process in question: defining impulse of a fluid stream as the product between mass flow-rate and velocity of the stream itself, each single jet shall be designed in such a way that the set of jets has an impulse similar to the impulse of the main stream of fumes passing along the tunnel 16 from the furnace 12 to suction plant.

The design condition is therefore the following:

$$\frac{W_{gas} \cdot V_{gas}}{N_{jets} \cdot (W_{jet} \cdot V_{jet})} \approx 1$$

wherein:

$W_{gas}$=mass flow-rate of the fumes in the tunnel (16) in a given injection section [kg/s]

$W_{jet}$=mass flow-rate of the single jet in the same injection section [kg/s]

$V_{gas}$=velocity of the fumes in the tunnel in correspondence with the same injection section [m/s]

$V_{jet}$=velocity of the single jet [m/s]

$N_{jets}$=number of jets on the given injection section [#]

For purely illustrative purposes, in the application described, considering the injection of air at room temperature, this condition is normally obtained with jets having a flow-rate of around 1,000 Nm.sup.3/h and a discharge velocity ranging from 85 to 105 m/s.

Within the proposed technical solution, due to the gas injected, a progressive increase in the flow-rate of gas passing through the preheating tunnel 16, is produced, therefore it may be necessary to consider jets with a greater impulse for the injection sections positioned further away from the furnace 12.

Following the flow of gases leaving the melting furnace 12 and entering the preheating tunnel 16, the first injection sections are designed to use lower flow-rates and velocities than the subsequent injection sections, due to the overall increasing flow-rate of the gas passing through the preheating tunnel.

Each injection section can be managed, controlled and regulated independently of the others, depending on the process status and the characteristics of the charge 11 present in the preheating tunnel 16 and gases 17 leaving the furnace.

In the simplest embodiment, the nozzles 15 are all the same and arranged on the top of the preheating tunnel 16 and their number basically depends on the width of the preheating tunnel 16 itself, considering an availability of about ⅔ of the central portion (where the "downwash" area is to be established) with a distance between each jet of about 450-500 mm. In order to obtain an effective impingement effect, the top of the preheating tunnel 16 must be positioned at a distance of around 800-1,200 mm from the charge present in the conveyor (if the present invention is applied to an existing plant, this may require a redesigning of the preheating tunnel). In case of particular configurations of the preheating tunnel 16, for example in the presence of plant constraints that do not allow the nozzles 15 to remain at the same distance from each other, a different arrangement and dimensioning of the jets can be used for obtaining an equivalent fluid-dynamic effect.

Contrary to the known plants and processes wherein the air injection is linked to the control of the combustion process from a stoichiometric point of view, in the present invention the jets of air or other gas are mainly used for obtaining certain turbulence conditions inside the preheating tunnel 16.

Even in the most common case of the use of air jets, the overall injection capacity of the system described is almost always lower than the flow-rate of air necessary for completing the combustion of the process gases 17 coming from the furnace 12, as the primary objective of the system described is to stabilize the turbulence; the control of the supply of combustion air of the process gases inside the preheating tunnel 16 is basically delegated to the modulation of the suction depression and width of the gap between the entrance of the preheating tunnel and the furnace (that can never be completely eliminated from a plant-engineering point of view). In this way, the injection of air as turbulence generator is significantly decoupled by the supply of ambient air for completing the combustion of the process gases.

The final objective of the present invention is to increase the combustion intensity of the process gases coming from the furnace and the heat exchange between them and the charge, thus increasing the overall energy efficiency of the melting process.

The improved mixing and combustion of the process gases released from the furnace achieved with the present invention allows to obtain a better thermal destruction of the polluting substances (and related precursors) present therein.

The present invention can also be applied to plants such as those described, for example, in the document WO2012007105 provided with a preheating tunnel and a heating tunnel of the metal charge of scrap.

Thanks to the present invention, the scrap charge heating takes place through a turbulence created in the preheating tunnel 16, unlike what happens in the known plants in which the introduction of air is carried out according only to the requirements of the chemical combustion process, without any link to the control of the motion field inside the preheating tunnel.

Thanks to the present invention, the use of deflectors inside the preheating tunnel 16 can also be avoided. These deflectors have disadvantages as they cause a significant pressure drop in the suction of the fumes, they require cooling and frequent maintenance operations as they operate within a flow of very hot and dusty gases (this not only represents a plant complication and a potential risk of leakages, but also causes a useless loss of thermal energy by the gases), they are difficult to regulate and manage from a practical point of view as it is not easy to change the incidence angle, and finally, their effect is limited when the velocity and therefore flow-rates to be treated are low.

The objectives of the invention mentioned in the preamble of the description have therefore been achieved.

The protection scope of the present invention is defined by the enclosed claims.

The invention claimed is:

1. A process for preheating a metal charge fed in continuous to an electric melting furnace through a preheating tunnel provided with a horizontal conveyor, the process comprising:

causing said metal charge to be hit, in countercurrent, by exhaust fumes or a first gas leaving said electric melting furnace, and by jets of a second gas ejected through a plurality of nozzles positioned on a hood of said preheating tunnel provided with side walls and said hood, wherein the process further comprises, arranging said plurality of nozzles in groups interspaced from each other in a longitudinal direction with respect to the preheating tunnel, and generating a turbulence by injecting the second gas to penetrate a stream of the first gas passing through the preheating tunnel, said nozzles simultaneously generating a vortex structure that comprises a descending central gas flow, and ascending flows adjacent to the side walls of the preheating tunnel, so as to enable a desired circulation of the first and the second gases, wherein a single jet of a nozzle of the plurality of nozzles is dimensioned so that a set of the jets has an impulse equivalent to an impulse of a main stream of the fumes that are passing along the preheating tunnel according to the following dimensioning condition:

$$\frac{W_{gas} \cdot V_{gas}}{N_{jets} \cdot (W_{jet} \cdot V_{jet})} = 1$$

wherein:

$W_{gas}$=mass flow-rate of the fumes in the preheating tunnel in a given injection section [kg/s], $W_{jet}$=mass flow-rate of the single jet in the given injection section [kg/s], $V_{gas}$=velocity of the fumes in the preheating tunnel in correspondence with the given injection section [m/s], $V_{jet}$=velocity of the single jet [m/s], $N_{jets}$=number of the jets on the given injection section.

2. The process according to claim 1, wherein the jets released from said plurality of nozzles are distributed transversely on the hood of the preheating tunnel in a non-uniform manner, with a greater concentration on a top of the hood of said preheating tunnel.

3. The process according to claim 1, wherein the jets released from said plurality of nozzles are distributed over about ⅔ of a cross-section of the preheating tunnel, leaving at least part of the side walls of the hood of said preheating tunnel free.

4. The process according to claim 1, wherein the nozzles are non-uniformly distributed longitudinally along said preheating tunnel, whereby said plurality of nozzles are provided at gas injection sections that are spaced apart with longitudinal sections of the preheating tunnel without said plurality of nozzles in order to avoid interference phenomena.

5. The process according to claim 4, wherein a first group of the nozzles is provided closer to the electric melting furnace than a remainder of the nozzles, and within a distance of 7-10 meters from the electric melting furnace.

6. The process according to claim 4, wherein the plurality of nozzles provide jets having velocities or flow rates that increase among subsequent gas injection sections.

7. A plant for implementing a process for preheating a metal charge fed in continuous to an electric melting furnace, comprising:

a preheating tunnel provided with a horizontal conveyor, wherein said metal charge is hit, in countercurrent, by a exhaust fumes or a first gas leaving said electric melting furnace; and a plurality of nozzles positioned on a hood of said preheating tunnel provided with side walls and said hood, said plurality of nozzles emitting jets of a second gas further hitting said metal charge, wherein at least two groups of the plurality of nozzles are provided on the hood of said preheating tunnel, interspaced from each other in a longitudinal direction with respect to the preheating tunnel, wherein the plurality of nozzles generate a turbulence by injecting the jets of the second gas to penetrate a stream of the first gas stream passing through the preheating tunnel, said nozzles simultaneously generating a horseshoe vortex structure comprising a descending central gas flow that forms a descending flow, and ascending flows that forms an ascending flow adjacent to the side walls of the preheating tunnel, so as to enable a desired circulation of the first and the second gases, and wherein a single jet of a nozzle of the plurality of nozzles is dimensioned so that a set of the jets has an impulse equivalent to an impulse of a main stream of the fumes that are passing along the preheating tunnel according to the following dimensioning condition:

$$\frac{W_{gas} \cdot V_{gas}}{N_{jets} \cdot (W_{jet} \cdot V_{jet})} = 1$$

wherein:

$W_{gas}$=mass flow-rate of the fumes in the preheating tunnel in a given injection section [kg/s], $W_{jet}$=mass flow-rate of the single jet in the given injection section [kg/s], $V_{gas}$=velocity of the fumes in the preheating tunnel in correspondence with the given injection section [m/s], $V_{jet}$=velocity of the single jet [m/s], $N_{jets}$=number of the jets on the given injection section.

8. The plant according to claim 7, wherein said plurality of nozzles are distributed transversely and non-uniformly on the hood of the preheating tunnel, with a greater concentration on a top of the hood of said preheating tunnel.

9. The plant according to claim 7, wherein said nozzles are distributed over about ⅔ of a cross-section of the preheating tunnel, leaving at least part of the side walls of the hood of said preheating tunnel free.

10. The plant according to claim 7, wherein said plurality of nozzles are distributed longitudinally and non-uniformly on the hood of the preheating tunnel, and wherein said plurality of nozzles are provided at sections along said preheating tunnel that are gas injection sections spaced apart with longitudinal sections of the preheating tunnel without said plurality of nozzles in order to avoid interference phenomena.

11. The plant according to claim 10, wherein there are from 2 to 4 of said gas injection sections spaced about 4-6 meters from each other in a longitudinal direction with respect to the tunnel.

12. The plant according to claim 10, wherein a first gas injection section of the gas injection sections is positioned closer to the electric melting furnace than a remainder of the gas injection sections and within a distance of 7-10 meters from the electric melting furnace.

13. The plant according to claim 10, wherein three of the gas injection sections are provided along the preheating tunnel, with four nozzles per gas injection section.

14. The plant according to claim 10, wherein the plurality of nozzles provide jets having velocities or flow rates that increase among subsequent gas injection sections.

15. The plant according to claim 7, wherein the plurality of nozzles are arranged on a top of the preheating tunnel in a number depending on a width of the preheating tunnel, with a distance of about 450-500 mm between each jet.

* * * * *